(12) United States Patent
McKee

(10) Patent No.: US 6,729,031 B2
(45) Date of Patent: May 4, 2004

(54) SUPPORT FOR A WINDOW

(75) Inventor: Michael McKee, Rocester (GB)

(73) Assignee: J.C. Bamford Excavators Limted, Uttoxeter Staffordshire (GB)

( * ) Notice: Subject to any disclaimer, the term of this patent is extended or adjusted under 35 U.S.C. 154(b) by 33 days.

(21) Appl. No.: 09/950,787

(22) Filed: Sep. 13, 2001

(65) Prior Publication Data

US 2002/0062608 A1 May 30, 2002

(30) Foreign Application Priority Data

Sep. 13, 2000 (GB) ............................................. 0022409

(51) Int. Cl.⁷ ................................................ E06B 1/04
(52) U.S. Cl. .................... 52/204.1; 52/204.5; 52/656.5; 52/745.16; 296/190.1; 296/201; 296/146.15; 296/96.21
(58) Field of Search ................................ 52/201, 204.1, 52/204.5, 208, 204.53, 656.5, 651.11, 653.1, 745.16; 296/190.01, 190.08, 190.1, 190.11, 200, 201, 146.15, 96.21; 49/40, 41; 248/208

(56) References Cited

U.S. PATENT DOCUMENTS

| | | | | |
|---|---|---|---|---|
| 242,059 A | * | 5/1881 | Scott ........................... | 52/201 |
| 3,259,345 A | * | 7/1966 | Martignoni et al. ..... | 244/129.3 |
| 3,802,530 A | * | 4/1974 | Purcell et al. ........... | 180/89.12 |
| 4,605,259 A | | 8/1986 | Hurlburt | |
| 4,772,065 A | | 9/1988 | Nakata et al. | |
| 4,899,507 A | * | 2/1990 | Mairlot ........................ | 52/222 |
| 5,063,717 A | | 11/1991 | Quaranta et al. | |
| 5,096,253 A | * | 3/1992 | Jo et al. .................. | 296/190.1 |
| 5,273,340 A | * | 12/1993 | Nelson et al. ......... | 296/190.08 |
| 5,595,133 A | | 1/1997 | Bullard | |
| 6,183,034 B1 | * | 2/2001 | Moody et al. ........... | 296/96.21 |
| 6,247,746 B1 | * | 6/2001 | Brush ..................... | 296/190.11 |
| 6,409,254 B2 | * | 6/2002 | Tiziano ................. | 296/190.08 |

FOREIGN PATENT DOCUMENTS

| | | |
|---|---|---|
| EP | 0 298678 | 7/1988 |
| EP | 0 429085 | 11/1990 |
| GB | 1 332 238 | 10/1973 |
| GB | 2 345 079 | 6/2000 |

* cited by examiner

Primary Examiner—Brian E. Glessner
(74) Attorney, Agent, or Firm—Marshall, Gerstein & Borun LLP

(57) ABSTRACT

A support for a window, includes a plurality of edge parts defining an opening to receive a window wherein at least one of the edge parts includes a first abutment surface and a second abutment surface, the first abutment surface being substantially planar and the second abutment surface being curved, each abutment surface being adapted to engage a window of a corresponding configuration.

15 Claims, 3 Drawing Sheets

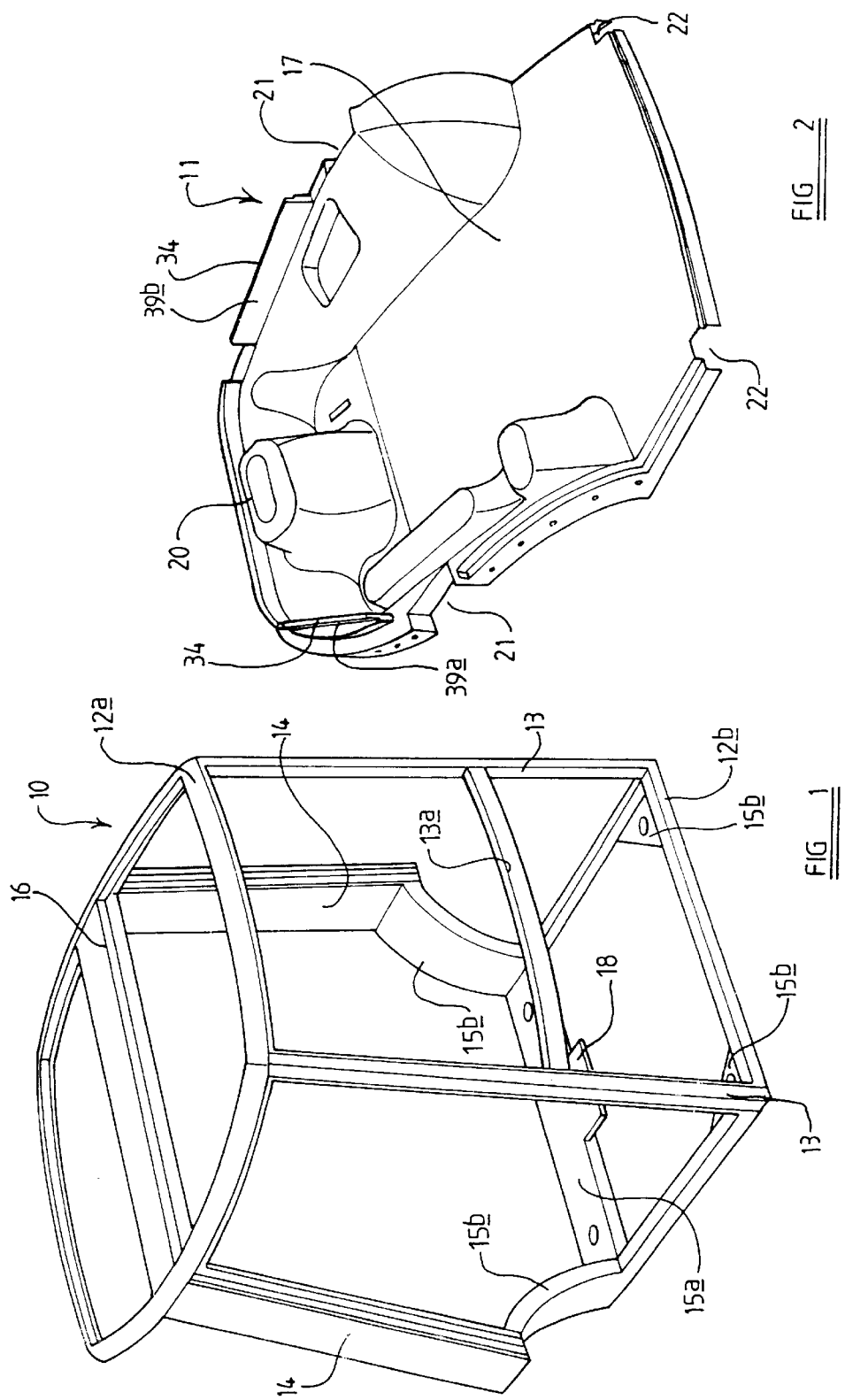

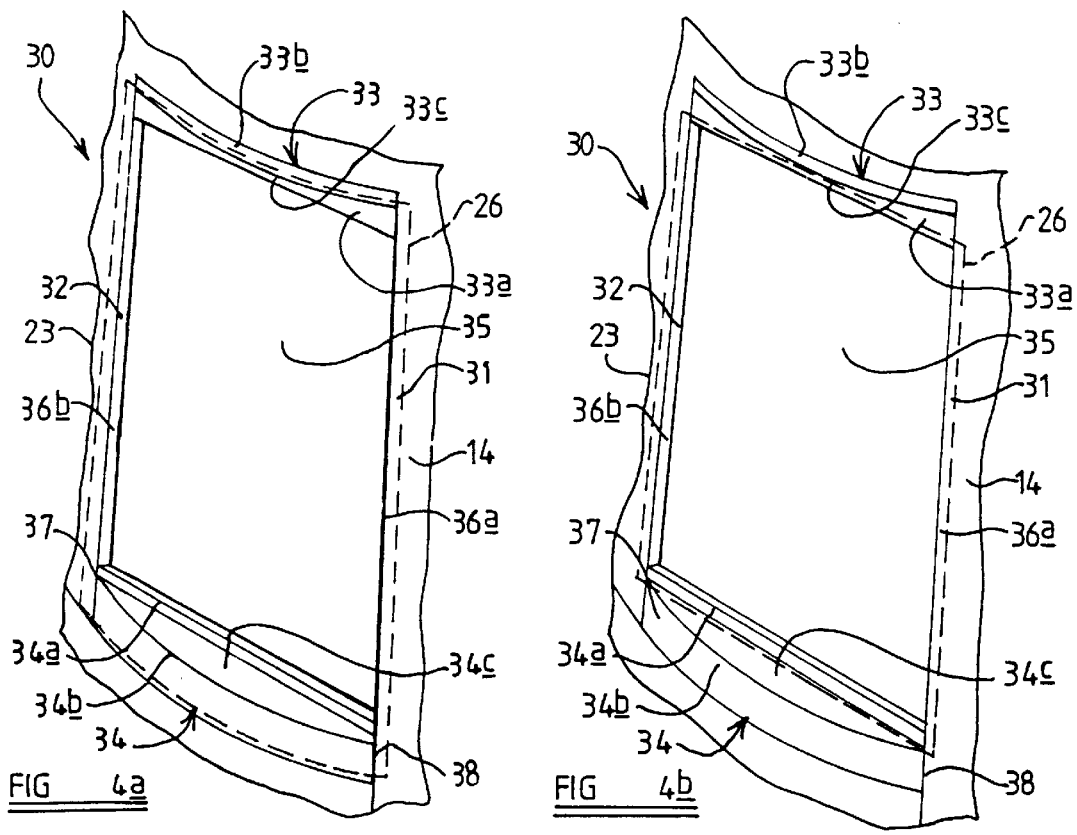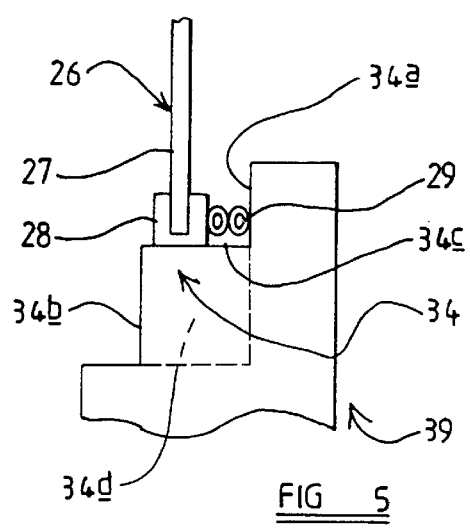

SUPPORT FOR A WINDOW

BACKGROUND OF THE INVENTION

This invention relates to support for a window, particularly in a load handling machine.

DESCRIPTION OF THE PRIOR ART

Windows which include curved panes of glass are used in many load handling machines. Curved windows are used to provide a more aesthetic appearance to a machine, and in some circumstances to provide improved lines of sight. Such panes conventionally includes toughened or laminated glass. It is more expensive to produce a curved pane, particularly of toughened or laminated glass than to produce a comparably sized pane of flat glass. A flat pane of glass may also be easier to obtain and/or cut to shape.

SUMMARY OF THE INVENTION

According to a first aspect of the present invention, we provide a support for a window, the support including a plurality of edge parts defining an opening to receive a window wherein at least one of the edge parts includes a first abutment surface and a second abutment surface the first abutment surface being substantially planar and the second abutment surface being curved, each abutment surface being adapted to engage a window of a corresponding configuration.

The window may include a casement with a pane of glass supported thereby, or may include a pane of glass with no or substantially no casement.

The window may be openable and may be fixed.

The second abutment surface may be provided on an abutment part releasably attached to the remainder of the support means, which abutment part may be removed from the remainder of the support means to expose the first abutment surface.

Preferably though, the first and second abutments are integrally provided by a respective edge part.

The support may include four edge parts, wherein two opposed edge parts include a first abutment surface and a second abutment surface and wherein the other opposed edge parts each include a single third abutment surface to engage the window, wherein the first abutment surfaces and third surfaces are substantially co-planar.

The second abutment surfaces may each have a pair of end parts wherein the end parts are generally co-planar with the first abutment surfaces and third abutment surfaces.

The window may be provided with a seal to engage an abutment surface.

Such a support may therefore receive either a curved or flat pane of glass as desired.

According to a second aspect of the invention, we provide a floor part for a cab of a vehicle or machine wherein the floor part provides an edge part for a support according to the fist aspect of the invention.

The edge part may have a first abutment surface and a second abutment surface.

The floor part may be made of a moulded synthetic plastics material and the edge part may be integrally provided by the floor part.

According to a third aspect of the invention, we provide a cab for a vehicle or machine, the cab including a support according to the first aspect of the invention.

The cab may include a roof part and the roof part may provide an edge part having a first abutment surface and a second abutment surface.

The cab may have at least one upwardly extending member and the at least one upwardly extending member may provide an edge part of the support means.

The cab may include a floor part according to the second aspect of the invention.

According to a fourth aspect of the invention we provide a method of assembling a window in a support according to the first aspect of the invention including the step of locating a window adjacent to one of the first abutment surface and the second abutment surface.

Where the second abutment surface is provided on a releasable abutment part, the method may include the step of attaching or removing the abutment part to or from the support means prior to locating the window.

According to a fifth aspect of the invention we provide a method of repairing a window having support according to the first aspect of the invention including replacing a window of curved configuration with a window of planer configuration.

BRIEF DESCRIPTION OF THE DRAWINGS

The invention will now be described by way of example only with reference to the accompanying drawings wherein FIG. 1 is a perspective view of a frame for a machine cab, FIG. 2 is a perspective view of a floor for a machine cab, FIG. 4a is a perspective view of a support means according to the present invention with a curved window provided thereon, and FIG. 4b is a view similar to FIG. 4a but with a planer window in position.

FIG. 5 is a section through a support means according to the present invention provided with a window.

DESCRIPTION OF THE PREFERRED EMBODIMENT

Figure 3:
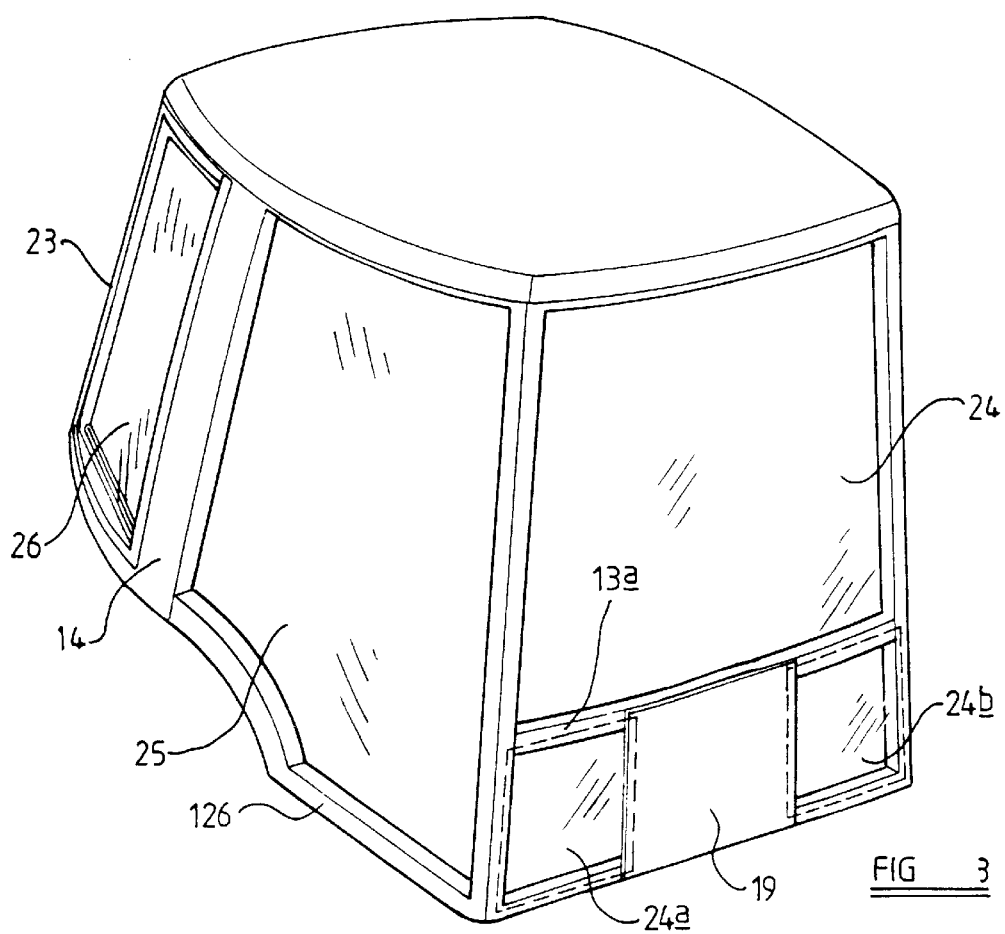
FIG. 3 is a perspective view of a cab including the frame, of FIG. 1 and the floor of FIG. 2.

Referring now to FIGS. 1 and 2, a frame 10 and a floor pan 11 for a load handling machine cab are shown. The frame 10 includes a roof part 12a and a base part 12b interconnected by forward upwardly extending parts which provide forward pillars 13, and located rearwardly thereof, further upwardly extending parts providing rear pillars 14. The fame 10 is provided with a floor cross member 15a with seat support 18 corner braces 15b and optionally, a roof stiffening member 16.

The forward pillars 13 are interconnected by a cross member 13a. The floor pan 11 is provided with recesses 21 disposed adjacent at the sides thereof to receive the rear pillars 14 and recesses 22 at the forward corners thereof to receive the forward pillars 13. The floor pan 11 is in the present example made of a moulded synthetic plastics material such as glass-fibre reinforced plastic, but may be made of other materials such as metal.

To assemble the cab, the floor pan 11 is introduced into the frame 10 from a rearward direction until the forward pillars 13 are received in the recesses 22 and the rear pillars 14 are received in the recesses 21. When the floor pan 11 is in place, it is supported by the floor frame cross member 15a and corner braces 15b. As seen in FIG. 3, the floor pan 11 and a roof part 12a may be interconnected by further additional upright members providing pillars 23. The cab may be then provided with glazed windows including at least a windscreen 24, quarter lights 24a, 24b, a forward side window 25 and a rearward side window 26. The rearward side window 26 as shown in FIG. 3 and FIG. 4a includes a pane of curved glass in the present example, to enhance the aesthetic appearance of the cab 10.

The windscreen 24 is a pane of usually laminated glass, which is bonded to the forward pillars 13, the cross member 13a and roof part 12a, the quarter lights 24a, 24b, usually of toughened glass, are bonded to the cross member 13a, the forward pillars 13, and either the base part 12b of the frame 10, or the floor pan 11. Between the quarter lights 24a, 24b there is provided a panel 19 e.g. of composite material, to which the quarter lights 24a, 24b are also bonded, the panel 19 providing a closure for an operator's console which may be provided in the cab.

A support means 30 for the rearward side window 26 is shown in more detail in FIGS. 4a and 4b. The support means 30 includes first and second side edge parts 31, 32 which in the present example are provided by the rear pillars 14 and further pillars 23 respectively. The support means 30 further includes an upper edge part 33, and a lower edge part 34. The edge parts 31,32,33,34 define an opening 35.

The upper edge part 33 includes a generally flat planer first abutment surface 33a, adjacent the opening 35, and a curved second abutment surface 33b interconnected by a transverse surface 33c. The lower edge part 34 similarly includes a generally flat planer first abutment surface 34a, adjacent the opening 35, and a curved second abutment surface 34b interconnected by a transverse surface 34c. The side edge parts 31, 32 each have provide a generally planar non-stepped third abutment surface 36a, 36b respectively. The upper first abutment surface 33a lower first abutment surface 34a and third abutment surfaces 36a 36b are generally co-planar. The second abutment surfaces 33b, 34b each include a pair of end parts 37, 38 respectively, wherein the end parts 37, 38 are co-planar with, or are disposed close to the plane of, the first abutment surfaces 33a, 34a and third abutment surfaces 36a 36b, but between the end parts 37, 38 the second abutment surfaces 33b, 34b curve outwardly of the support means 30 relative to the first abutment surfaces 33a, 34a.

The curvature of the second abutment surfaces 33b, 34b is selected to match the curvature of an inwardly directed face of the window pane 26.

The support means 30 of FIGS. 4a and 4b is therefore able to accommodate both curved and flat windows. The edges of a curved window will engage the second curved abutment surfaces 33b, 34b and the third abutment surfaces 36a, 36b. Alternatively, if it is desired to insert a generally flat planer window, a window is provided of such a size that it will fit between the transverse surfaces 33c, 34c to engage the first abutment surfaces 33a, 34a and the third abutment surfaces 36a, 36b.

The edge part 31, 32, 33, 34 may be provided integrally with or attached to the pillars 14, 23, roof part 12a and floor pan 11 respectively of the cab 10. The lower edge part 34 of the support means 30 in the present example is integrally provided by the floor pan 11 but may be provided in base frame 12b member. In FIG. 2 the floor pan 11 is shaped accordingly with upstanding structures 39a, 39b to provide the lower edge parts 34 of a pair of windows 26.

One or other or both of the second abutment surfaces 33b, 34b might be provided on a respective removable abutment portion (see 34d on FIG. 5) which may be attached to the corresponding first abutment surface 33a, 34a when it is desired to fit a curved window, but which may be removed to expose the planer first abutment surface 33a, 34a when it is desired to fit a flat window in the window opening.

As shown in FIG. 5, where the window as is an openable window, the window 26 may include a pane of glass 27 having an edge frame 28 of suitable material, with a seal 29 attached to the edge frame 28 to engage an abutment surface, in the present example, the lower first flat abutment surface 34a. However, the window 26 may be openable and frameless, as desired. It might alternatively be envisaged that the window 26 might be firmly held in position adjacent to the first abutment surface 34a or second abutment surface 34b or an abutment surface of any other edge of the support means as appropriate by means of suitable beading or other attachment means. The window may include a casement if desired.

When it is desired to replace, for example, a broken window 26 according to the method of the fourth aspect of the invention, the replacement window may include either a flat or curved piece of glass. The method may, for example include the steps of removing the remains of the previous window 26, fitting a replacement flat pane such that it engages surfaces 36a, 36b, 34a and 33a, either bonding the pane to the abutment surfaces or providing a suitable seal 29 and edge frame 28 to hold the window in place. Where one or other or both of the curved abutment surfaces 33b, 34b, are provided on removable abutment portions, the removable abutment portions may be detached from the roof part 12a and/or floor pan 11 or floor frame members, to expose the first abutment surfaces 33a, 34a. Where it is designed to replace a flat pane of glass with a curved pane of glass, the process may be adapted accordingly.

The window 26 pane may be made of toughened or laminated glass as desired.

A support means in accordance with the invention may be provided for any desired window on a vehicle or machine, of any appropriate desired shape or curvature.

What is claimed is:

1. A support for a window, the support including a plurality of edge parts defining an opening to receive a window, and wherein a pair of the edge parts are opposed, each of the opposed edge parts including a first abutment surface and a second abutment surface, the first abutment surface being substantially planar and arranged to receive a portion of a planar window and the second abutment surface being curved and arranged to receive a portion of a curved window, the first abutment surface of each edge part being disposed generally parallel to the second abutment surface of the same edge part when the edge part is viewed in cross section, and wherein at least another one of the edge parts includes a third abutment surface arranged to receive a portion of either the planar window or the curved window.

2. A support for a window, the support including four edge parts defining an opening to receive a window and wherein at least two opposed edge parts each includes a first abutment surface and a second abutment surface, the first abutment surface being substantially planar and the second abutment surface being curved, each abutment surface being adapted to engage a window of a corresponding configuration, wherein the first abutment surface of each edge part is generally non perpendicular relative to the second abutment surface of the same edge part, and wherein the other opposed edge parts each include a third abutment surface to engage the window wherein the first abutment surfaces and third abutment surfaces are substantially co-planar.

3. A support according to claim 2 wherein the edge parts of the window are adapted to support a pane of glass having a casement.

4. A support according to claim 2 wherein the window includes a pane of glass, at least a portion of the plane of glass having no casement.

5. A support according to claim 2 wherein the window is openable.

6. A support according to claim 2 wherein the window is fixed.

7. A support according to claim 2 wherein the second abutment surface is provided on an abutment part releasably attached to the remainder of the support which is removable from the remainder of the support to expose the first abutment surface.

8. A support means according to claim 2 wherein the first and second abutment surfaces are integrally provided by the edge part.

9. A support according to claim 2 wherein the second abutment surfaces each include a pair of end parts wherein the end parts are generally co-planar with the first abutment surface.

10. A support according to claim 2 wherein the window is provided with a seal to engage at least one of the abutment surfaces.

11. A support according to claim 2, wherein the window opening is defined in a cab, and wherein a lower one of the edge parts is integrally formed by a floor part of the cab.

12. A support according to claim 2, wherein the window opening is defined in a cab, and wherein an upper one of the edge parts is integrally formed in a roof part of the cab.

13. A support according to claim 11 wherein the floor part is made of a moulded synthetic plastics materials.

14. A method of repairing a window having a support of the kind having a plurality of edge parts defining an opening to receive a window wherein at least one of the edge parts includes a first abutment surface and a second abutment surface, the first abutment surface being substantially planar and the second abutment surface being curved, each abutment surface being adapted to engage a window of a corresponding configuration, the method including replacing a window of curved configuration with a window of planar configuration.

15. A method according to claim 14 wherein the second abutment surface is provided on a releasable abutment part, the method including the step of attaching or removing the abutment part to or from the support prior to locating the window.

* * * * *